Patented Nov. 6, 1934

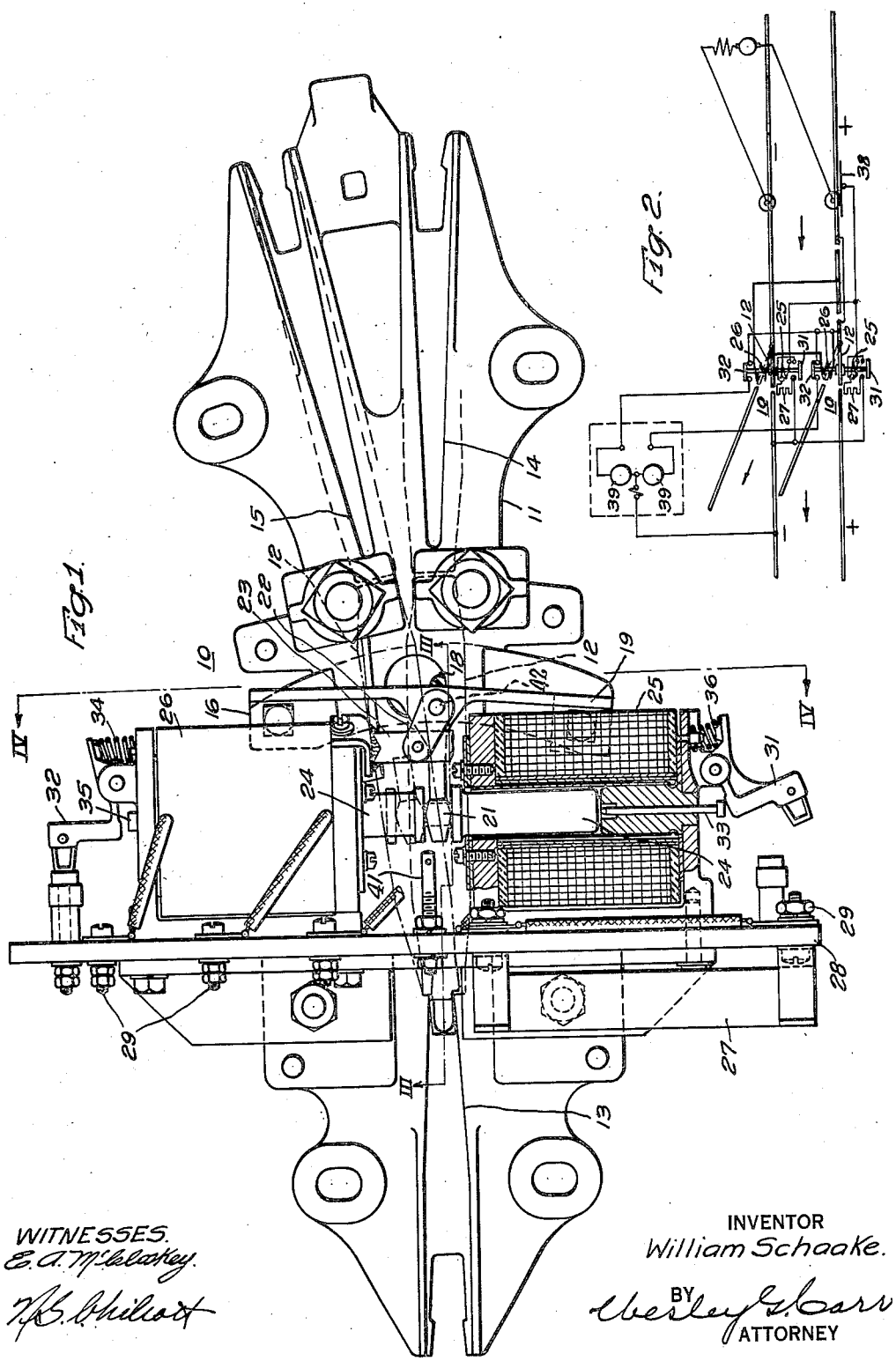

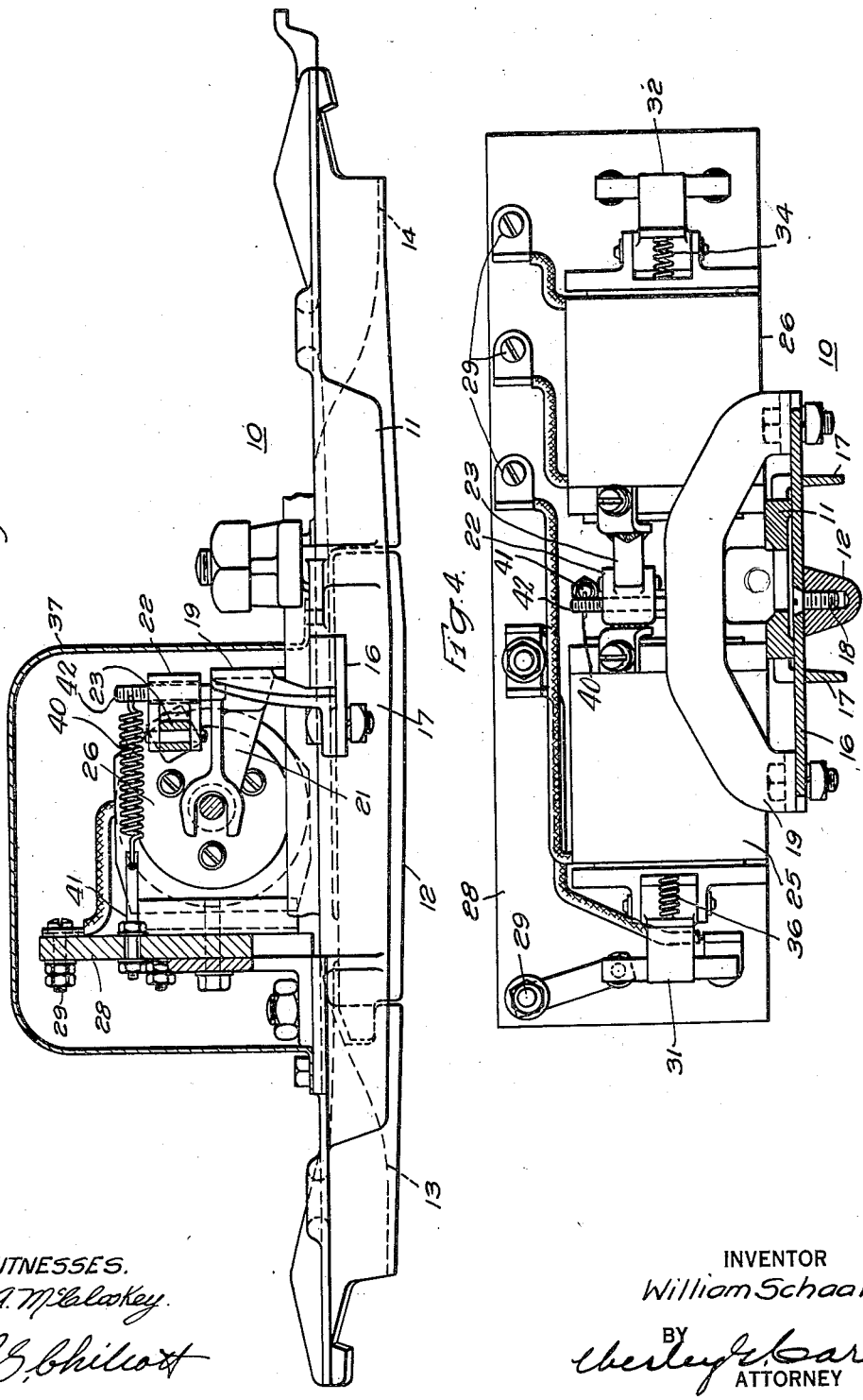

1,979,708

UNITED STATES PATENT OFFICE 1,979,708

TROLLEY FROG

William Schaake, Pittsburgh, Pa., assignor to Westinghouse Electric & Manufacturing Company, a corporation of Pennsylvania Application January 6, 1931, Serial No. 506,919

1 Claim. (Cl. 191—38)

My invention relates to trolley frogs and more particularly to electrically operated frogs or switches which are suitable for use in overhead trolley systems.

In order that a trackless-trolley bus, which is supplied with electric power from a double-conductor overhead trolley system and is equipped with current-collecting devices mounted in a swivel polehead, may be turned from a main bus line into a side bus line without the current collectors becoming disengaged from the trolley wires, it is necessary to provide trolley frogs having movable members, which may be electrically operated, for guiding the current collectors to the side conductors when it is desired to turn to a side street.

An object of my invention, generally stated, is to provide an electrically operated trolley frog which shall be simple and reliable in operation and which may be readily and economically manufactured.

A more specific object of my invention is to provide an electrically operated trolley frog which may be operated from a trolley bus or a similar electrically propelled vehicle.

Another object of my invention is to provide for automatically controlling the operation of a trolley frog from an electrically propelled vehicle.

Other objects of my invention will be described fully hereinafter or will be apparent to those familiar with the art.

For a fuller understanding of the nature and scope of my invention, reference may be had to the following detailed description, taken in conjunction with the accompanying drawings, in which, Figure 1 is a top plan view of an electrically operated trolley frog constructed in accordance with my invention, a portion being cut away in order to show details of the construction;

Fig. 2 is a diagrammatic view of an overhead trolley structure, showing a control system for controlling the operation of trolley frogs embodying my invention.

Fig. 3 is a view, of the operating mechanism, taken along the line III—III of Fig. 1, the frog being shown in side elevation; and Fig. 4 is a view, in section, taken along the line IV—IV of Fig. 1.

Referring to the drawings, 10 designates, generally, a trolley frog which comprises a trolley pan 11 and an electrically operated mechanism for actuating a movable tongue 12, which is pivotally mounted on the bottom side of the trolley pan 11.

The trolley pan may be of a type similar to those usually provided in an overhead trolley structure at street intersections where it is necessary for an electrically propelled vehicle to turn from the main line into a side line. The trolley pan is provided with channel or guide members 13, 14 and 15 for controlling the direction of movement of a trolley wheel or other current-collecting device. The guide members 13 and 14 are disposed in alined relation, and the guide member 15 is disposed at an angle to the alined members 13 and 14.

In order that the current collector shall be caused to follow the correct guide member when passing from the guide 13 to the guide 14, as the vehicle is moving straight ahead, or from guide 13 to guide 15 in case the vehicle is turned into a side street, the movable tongue 12 is provided. The tongue 12 is pivotally mounted on the bottom side of the trolley pan 11 at the end of the tongue adjacent to the guide member 13. The other end of the tongue 12 is carried by a curved plate 16 which extends through slots provided in downwardly extending flanges 17 (Fig. 4) on the bottom of the trolley pan 11. The tongue 12 is fastened to the plate 16 by a screw 18 (see Fig. 4).

As shown, a yoke 19, which straddles the trolley pan 11, is connected to the ends of the plate 16. The yoke 19 is provided with a horizontally extending lever arm or goose-neck 21 having a bifurcated end. The yoke is pivotally connected, by a link 22, to a supporting bracket 23 which is rigidly mounted on top of the trolley pan 11.

Referring particularly to Fig 1, it will be seen that the tongue 12 may be actuated from the position in alinement with the guide member 14, as shown, to a position in alinement with the guide 15, as shown by the broken lines, by actuating the yoke 19 about its pivotal point on the bracket 23, thereby actuating the tongue 12 about its pivotal point on the trolley pan 11.

With a view to providing for actuating the tongue 12 to a desired position, a solenoid plunger 24 is disposed to actuate the yoke 19 about its pivotal point by means of the lever arm 21. The bifurcated end of the lever arm 21 is engaged by two shoulders on the plunger 24, as shown in Fig. 1.

Two solenoid coils 25 and 26 are disposed to actuate the plunger 24 in alternate directions. When the coil 25 is energized, the coil 26 being deenergized, the plunger is actuated toward the coil 25 and likewise, when the coil 26 is energized, the plunger is drawn in the opposite direction. A resistance tube 27 is mounted upon a panel 28 and may be connected in series with the coil 25. Terminal studs 29 are provided on the panel 28 to facilitate the making of electrical connections to the solenoid coils.

As illustrated, auxiliary contact members or interlocks are disposed to be actuated by the plunger 24. When the plunger is actuated by the coil 25, an interlock 31 is opened by a tappet rod 33, and an interlock 32 is closed by a spring 34. When the plunger is actuated by the coil 26, the interlock 32 is opened by a tappet 35, and the interlock 31 is closed by a spring 36.

A cover 37 is provided for enclosing the entire electrically operated mechanism to protect it from moisture and dirt.

The operation of the above-described apparatus may be understood by referring to Fig. 2, which shows a schematic diagram of an overhead trolley structure for supplying power to a trolley bus. Two complete frogs 10 are required at a "turn-out" point on a two-conductor system. It is assumed that the bus is moving in the direction indicated by the arrows, also that the trolley conductor marked "+" is connected to the positive side of the power source and the conductor marked "—" is connected to the negative side of the power source.

When the trolley wheels are in the position shown on the drawings, the one wheel engages a contacting device 38 which is mounted adjacent to the conductor. Therefore, a circuit is established from the positive conductor, through both of the coils 25, to the negative conductor. If the movable tongues 12 are in the "straight-ahead" position, they will remain in that position, but, if they are in the "turn-out" position, they will be actuated to the "straight-ahead" position by the plunger, when operated by the coils 25.

If the motor is connected to the power source when the one trolley wheel is on the section of conductor which is insulated from the positive conductor, a circuit is established from the positive conductor, through the two coils 26, which are connected in series, the positive trolley wheel, the motor, and the negative trolley wheel, to the negative conductor. Therefore, the movable tongues 12 will both be actuated to the "turn-out" position by the coils 26.

If it is not desired to turn into the side street, the motor may be disconnected from the power source, and the vehicle be permitted to coast across the insulated section of conductor, thereby interrupting the circuit through the coils 26 and permitting the movable tongues 12 to remain in the "straight-ahead" position.

As shown on the diagram, the interlocks 32 may be utilized to light signal lamps 39 to indicate the position of the movable tongues to the operator of the bus. The interlocks 31 may be used to shunt the resistors 27 when the tongues 12 are in the "turn-out" position, thereby ensuring that the tongues will be actuated to the "straight-ahead" position as the trolley wheel engages the contacting device 38. When the movable tongues 12 are in the "straight-ahead" position, the resistors 27 are in series with the coils 25, thereby limiting the amount of current permitted to flow through the coils 25. In this manner, the coils will be prevented from being overheated in case a vehicle stops with a trolley wheel engaging the contacting device 38.

In order to insure that the lever arm 19, and thereby the tongue 12, will be secured in the extreme operating positions, a tension spring 40 is provided. One end of the spring 40 is anchored, by means of an eye bolt 41, to the panel 28 while the other end is secured to a pin 42 which is fastened to the lever arm 19. By means of the spring 40, a snap acting toggle is provided which serves to resiliently bias the tongue 12 to either of its operating positions, thereby maintaining it in proper alinement with either of the guides 14 or 15. The spring 41 is omitted from Fig. 1 of the drawings in order to more clearly illustrate the invention.

Since many modifications may be made in the apparatus and arrangement of parts without departing from the spirit of my invention, I do not wish to be limited other than by the scope of the appended claims.

I claim as my invention:

In a trolley frog for an overhead trolley wire system, in combination, a trolley pan having grooves for a main conductor passing straight through the frog and a branch conductor terminating at the frog, a tongue pivotally mounted from the underside of said pan for guiding a current collector to follow either the main or the branch conductor, actuating means mounted on top of said pan for operating said tongue to either of said positions, a plate secured to said tongue, and a yoke secured to said plate and disposed to be moved by said actuating means, said yoke being positioned around the branch conductor to permit the conductor to pass through the frog without interference.

WILLIAM SCHAAKE.